United States Patent Office
3,535,299
Patented Oct. 20, 1970

3,535,299
PROCESS FOR THE POLYMERIZATION AND COPOLYMERIZATION OF OLEFINS
Pierre Dassesse, Jemeppe-sur-Sambre, and Roger Dechenne, Strombeek, Belgium, assignors to Solvay & Cie, Brussels, Belgium, a corporation of Belgium
No Drawing. Continuation-in-part of application Ser. No. 377,476, June 24, 1964. This application May 20, 1968, Ser. No. 730,599
Claims priority, application France, Apr. 23, 1968, 149,053
Int. Cl. C08f 1/56, 3/06
U.S. Cl. 260—88.2          19 Claims

ABSTRACT OF THE DISCLOSURE

Polymerization and copolymerization of olefins is carried out in the presence of a catalyst obtained by reacting a compound of a transition metal with a hydroxychloride of manganese, nickel, or cobalt and then activating this material with an organometallic compound.

---

This is a continuation-in-part of our copending U.S. patent application Ser. No. 377,476 filed June 24, 1964, now Pat. No. 3,400,110.

BACKGROUND OF INVENTION

The present invention pertains to a process for the polymerization and the copolymerization of olefins in the presence of new solid catalysts.

Our Belgian Pat. No. 650,679, dated July 17, 1964, discloses a process for the polymerization and the copolymerization of olefins in the presence of a catalyst which is obtained by the reaction of a compound of a transition metal with a solid support, which is a hydroxychloride of a bivalent metal and then activating the thus-obtained product with an organometallic compound.

It has been shown that hydroxychlorides of magnesium, calcium, cadmium, zinc and iron are useful reactive supports for producing these catalysts. The hydroxychloride of magnesium Mg(OH)Cl has been used preferably.

SUMMARY OF THE INVENTION

It has now been discovered, surprisingly, that other hydroxychlorides of bivalent metals, the hydroxychlorides of manganese, nickel and cobalt, are particularly suitable as reactive supports.

The process of the invention comprises effecting the polymerization and the copolymerization of olefins in the presence of a catalyst obtained by activating, by means of an organometallic compound, the product of the reaction between a compound of a transition metal and a solid support comprising a hydroxychloride of a metal selected from the group consisting of manganese, nickel, and cobalt.

DESCRIPTION OF THE PREFERRED EMBODIMENTS

The supports used in obtaining the present new catalysts may be hydroxychloride of manganese, nickel, and cobalt. These hydroxychlorides correspond in general, at least in atomic ratio, to the following formulas: $Mn(OH)Cl$, $Ni(OH)Cl$, $Co(OH)Cl$, and $Co_2(OH)_3Cl$. It is not necessary for the heart or core of the support to contain the desired chemical composition, in view of the fact that the fixation of the derivative of a transition metal is effected or carried out on the surface of the support and that it is at this level that the catalytic properties of the solid catalyst are located. Thus, one of the above hydroxychlorides may be used as a coating on a core of inert material to form the present catalyst.

These hydroxychlorides can be prepared according to standard methods, and more particularly, from the chlorides, hydroxides or oxides of the selected metals. They are preferably dried carefully before being put into contact with the derivatives of the transition metals.

The mechanism of the chemical fixation of these derivatives is not precisely known, but there is good reason to believe that the reaction involves the oxygen atoms of the support.

The compounds of transition metals used for the preparation of catalysts of this invention are selected from those which contain radicals which are reactive with respect to hydroxyl groups. Especially useful for this purpose are the halogen derivatives, halogenoalkoxides and alkoxides, including the oxyhalides and oxyalkoxides of metals of Groups IV$b$, V$b$ and VI$b$ of the Periodic Table, and more particularly, the derivatives of titanium, vanadium and chromium; for example, $TiCl_4$, $Ti(OC_2H_5)_4$, $Ti(OC_2H_5)_3Cl$, $VOCl_3$, $VCl_4$, $VO(OC_4H_9)_3$ and $$CrO_2Cl_2$$

The fixation reaction must be effected with protection from humidity. It can be carried out in an inert liquid diluent such as a hydrocarbon, for example, hexane, tetralin or xylene.

However, it is preferable to operate according to the technique disclosed in our French Pat. No. 1,448,320, dated June 25, 1965. According to this procedure, the reaction is carried out in a medium of practically pure transition metal compound, in the liquid state. The mixture of liquid, transition-metal compound and metal hydroxychloride is heated to a temperature of about 80° to 180° C.; after the chemical fixation reaction is complete, the resultant solid catalytic material is separted from the liquid reaction medium. Then the solid catalytic material is treated in order to eliminate residues of the transition metal compound not fixed chemically on the support. This treatment can be carried out by washing with a solvent such as hexane, or by evaporation, preferably under reduced pressure, or by sweeping with an inert gas.

After this reaction, the transition metal compound is chemically bound to the support and cannot be eliminated by physical means such as washing.

The catalytic solid material thus obtained must then be activated by contact with an organometallic compound, which is selected from the organic derivatives of metals of Groups I, II, III, and IV of the Periodic Table, metals of Groups I, II, IIIa and IVa are particularly useful. Trialkylaluminum such as triethyl and tributylaluminum and a halogen derivative of alkylaluminum such as diethylaluminum chloride and diethyl aluminum fluoride are especially preferred activators. However, other organometallic compounds such as $LiAl(i-C_4H_9)_4$, $Zn(C_2H_5)_2$ and $Sn(n-C_4H_9)_3H$ may also be used. It has been found that organometallic compounds in general are useful activators; commonly and for convenience alkylmetallic compounds are used wherein each alkyl group contains from 1 to 20 carbon atoms.

The process according to the invention is applicable to the polymerization and to the copolymerization of olefins and is especially useful for the production of polyethylene, polypropylene and ethylene-propylene copolymers.

Applied to the polymerization of ethylene, the catalyzers of the invention make it possible to produce polyethylene of particularly high linearity, namely polyethylene containing less than one methyl ($CH_3$) group per 1000 atoms of carbon. Further, polyetrylene produced according to the present invention has no trace of vinylic, transinternal or vinylidenic unsaturation.

The new catalysts show extremely elevated or increased activities for the polymerization of propylene and

3 for the copolymerization of ethylene and propylene, yielding amorphous products having excellent elastomeric properties.

The examples which follow are given to illustrate the best mode currently contemplated for carrying out the present invention and these examples must not be construed as limiting the invention in any manner whatsoever.

EXAMPLE 1

Manganese hydroxychloride Mn(OH)Cl is prepared by partial precipitation of a concentrated solution of $MnCl_2$ with NaOH as described H. R. Oswald and W. Feitknecht (Helv. Chim. Acta 1961, volume 44, page 853).

To 100 ml. of tetralin containing dissolved therein, 9.5 g. of $TiCl_4$ is added, 60 g. of Mn(OH)Cl. The suspension is brought to the boiling point and it is then refluxed for a period of 1 hour. The solid material is separated and washed with hexane until the complete disappearance of $Cl^-$ ions in the washing solvent. The product is dried under vacuum. Analysis shows that it contains 6.5 g. of fixed Ti per kg.

This solid catalyst in an amount of 1.95 g. is introduced in an autoclave of 1.5 l. while the autoclave which contains 500 ml. of hexane and 0.286 g. of triethylaluminum is swept with pure, dry nitrogen. After injection of 250 g. of propylene, the mixture is heated at a temperature of 50° C. over a period of 5 hours.

After degasing, i.e., removal of the gaseous nonpolymerized monomer, washing of the polymer with methanol and drying, 93 g. of solid polypropylene is obtained, characterized by an intrinsic viscosity of 0.26 in the tetralin at 140° C.

The catalytic activity was 1470 g. p.p./h.g. Ti and the productivity of the catalyst is 41.5 g. p.p./g.

EXAMPLE 2

Nickel hydroxychloride, Ni(OH)Cl is prepared by precipitation from a solution of $NiCl_2$ treated with NaOH. After washing with methanol, the solid is dried under vacuum to a constant weight.

The reaction with $TiCl_4$ is carried out in refluxing xylene for a period of 1 hour. After washing, a solid catalyst is obtained containing 3 g. Ti per kg.

This catalytic solid in an amount of 4.21 g. and 0.303 g. of triethylaluminum are used for the polymerization of propylene, which is carried out as described according to Example 1.

Solid polypropylene in an amount of 71 g. is obtained, the intrinsic viscosity of which, measured in the tetralin at 140° C. is 0.27. The catalytic activity is 1120 g. p.p./h.g. Ti and the productivity of the catalyst is 15.5 g. p.p./g.

EXAMPLE 3

A solid having an empirical formula corresponding to $Co_2(OH)_3Cl$ is prepared by reacting $CoCl_2$ with $Co(OH)_2$. Analysis of this solid by means of X-ray diffraction has shown that in addition to $Co_2(OH)_3Cl$, it contains traces of Co(OH)Cl and $Co(OH)_2$.

The reaction with $TiCl_4$ carried out according to Example 2 in xylene yields a catalytic solid containing 3.5 g. Ti/kg.

This catalytic solid in an amount of 4.16 g. and 0.344 g. of triethylaluminum have been used for the polymerization of propylene under the conditions indicated in Example 1. Polypropylene in an amount of 68 g. is thereby obtained, the intrinsic viscosity of which, measured in the tetralin at 140° C. is 0.29. The catalytic activity is 935 g. p.p./h.g. Ti and the productivity of the catalyst is 15 g. p.p./g.

EXAMPLE 4

Manganese hydroxychloride in an amount of 8.85 g. prepared as described in Example 1 is dispersed in 50 ml. of pure $TiCl_4$. This mixture is heated for a period of 1 hour at 130° C. The $TiCl_4$ is removed by distillation at a temperature of 130° C. and the resulting solid is then washed with cold hexane. After drying under vacuum, a catalytic solid is obtained containing 0.4 g. Ti/kg.

The following is introduced, under nitrogen, in a 3 l. autoclave:

5 ml. of a solution of 200 g./l. of triisobutylaluminum in hexane.
1 l. of pure, dry hexane.
3.249 g. of solid catalyst.

The temperature of the autoclave is brought to 80° C. and then hydrogen is introduced under a pressure of 8 kg./cm.$^2$ and ethylene under a pressure of 4 kg./cm.$^2$. Polymerization is then carried out for a period of 2 hours at a temperature of 80° C., while a constant pressure is maintained by means of the continuous introduction of ethylene. Polyethylene in an amount of 35 g. is obtained, with a catalytic activity of 3400 g. p.e./h.g. Ti atm. $C_2H_4$.

EXAMPLE 5

A reaction is carried out as indicated in Example 4; with Ni(OH)Cl identical to the one prepared in Example 2, and pure $TiCl_4$. In this manner a catalytic solid is obtained containing 3.7 g. Ti/kg.

Polymerization carried out as indicated in Example 4 with 0.975 g. of this catalytic solid and 0.2 g. of $Al(iBu)_3$ has resulted in 133 g. of polyethylene, thus this catalyst has a catalytic activity of 4650 g. p.e./h.g. Ti atm. $C_2H_4$.

EXAMPLE 6

A paste of $Co(OH)_2$ is prepared by dissolving 50 g. of $CoCl_2.6 H_2O$ in water, adding 17 g. of an aqueous NaOH solution and then by centrifugating the precipitate obtained. This paste is added to 50 g. of $CoCl_2.6 H_2O$ heated until dissolution in its crystallization water. After homogenization, the paste obtained is subjected to a temperature of 85° C. for a period of 15 hours. The conglomerate product is crushed and then dried under vacuum. Analysis shows that it is a Co(OH)Cl in which the Cl/Co ratio is 1.1.

The reaction of this product with $TiCl_4$ is carried out under the conditions indicated in Example 4 and results in a catalytic solid containing 11 g. Ti/kg.

Polymerization of ethylene is carried out by means of 0.234 g. of this catalytic solid and 0.2 g. of triisobutylaluminum and results in 111 g. of polyethylene, which corresponds to a catalytic activity of 5390 g./h.g. Ti atm. $C_2H_4$.

What we claim and desire to secure by Letters Patent is:

1. Process for the polymerization and the copolymerization of α-olefins comprising carrying out said polymerization and copolymerization in the presence of a catalyst obtained by activating, wtih an organic derivative of a metal selected from the group consisting of elements of Groups I, II, IIIa and IVa of the Periodic Table, the reaction product of a compound of a transition metal selected from the group consisting of halides, haloalkoxides and alkoxides of transition metals selected from the group consisting of the elements of Groups IVb, Vb and VIb of the Periodic Table and a hydroxychloride of a metal selected from the group consisting of manganese, nickel, and cobalt.

2. Process according to claim 1, in which said hydroxychloride of said metal is a compound having an empirical formula selected from the group consisting of Mn(OH)Cl, Ni(OH)Cl, Co(OH)Cl, and $Co_2(OH)_3Cl$.

3. Process according to claim 1 in which said transition metal is titanium.

4. Process according to claim 1 in which said transition metal is vanadium.

5. Process according to claim 1 in which said transition metal is chromium.

6. Process according to claim 1 in which said compound of a transition metal is selected from the group consisting of $TiCl_4$, $Ti(OC_2H_5)_4$, $Ti(OC_2H_5)_3Cl$, $VOCl_3$, $VCl_4$, $VO(OC_4H_9)_3$, and $CrO_2Cl_2$.

7. Process according to claim 1 in which said hydroxychloride is manganese hydroxychloride.

8. Process according to claim 1 in which said hydroxychloride is nickel hydroxychloride.

9. Process according to claim 1 in which said hydroxychloride is cobalt hydroxychloride.

10. Process according to claim 1 in which said organometallic compound is selected from the group consisting of trialkylaluminum and alkylaluminum halide.

11. A catalytic solid for the polymerization of olefins consisting essentially of the product obtained by reacting a compound of a transition metal selected from the group consisting of halides, haloalkoxides and alkoxides of transition metals selected from the group consisting of the elements of Groups IV$b$, V$b$ and VI$b$ of the Periodic Table with a hydroxychloride of a metal selected from the group consisting of manganese, nickel, and cobalt.

12. A catalytic solid according to claim 11 in which said transition metal is titanium.

13. A catalytic solid according to claim 11 in which said transition metal is vanadium.

14. A catalytic solid according to claim 11 in which said transition metal is chromium.

15. A catalytic solid according to claim 11 in which said compound of a transition metal is selected from the group consisting of $TiCl_4$, $Ti(OC_2H_5)_4$, $Ti(OC_2H_5)_3Cl$, $VOCl_3$, $VCl_4$, $VO(OC_4H_9)_3$, and $CrO_2Cl_2$.

16. A catalytic solid according to claim 11 in which said hydroxychloride is manganese hydroxychloride.

17. A catalytic solid according to claim 11 in which said hydroxychloride is nickel hydroxychloride.

18. A catalytic solid according to claim 11 in which said hydroxychloride is cobalt hydroxychloride.

19. A catalytic solid for the polymerization of olefins according to claim 11 in which said catalytic solid has been activated with an organic derivative of a metal selected from the group consisting of elements of Groups I, II, III$a$ and IV$a$ of the Periodic Table.

References Cited

UNITED STATES PATENTS

| | | | |
|---|---|---|---|
| 3,214,417 | 10/1965 | Blogaert et al. | 260—88.2 |
| 3,326,877 | 6/1967 | Orzechowski et al. | 260—93.7 |
| 2,970,134 | 1/1961 | Anderson | 260—94.3 |

OTHER REFERENCES

Feitknecht et al.: Chemical Abstracts, vol. 43, col. 8929 (1949).

JOSEPH L. SCHOFER, Primary Examiner

E. J. SMITH, Assistant Examiner

U.S. Cl. X.R.

252—429, 431, 441; 260—93.7, 94.9